US006849186B2

(12) United States Patent
Johnson et al.

(10) Patent No.: US 6,849,186 B2
(45) Date of Patent: Feb. 1, 2005

(54) COMPOSITE PARTICLES

(75) Inventors: James R. Johnson, Naples, FL (US); Majid Entezarian, Hudson, WI (US)

(73) Assignee: Phillips Plastic Corporation, Phillips, WI (US)

( * ) Notice: Subject to any disclaimer, the term of this patent is extended or adjusted under 35 U.S.C. 154(b) by 169 days.

(21) Appl. No.: 09/983,322

(22) Filed: Oct. 24, 2001

(65) Prior Publication Data

US 2002/0162798 A1 Nov. 7, 2002

Related U.S. Application Data

(63) Continuation-in-part of application No. 09/846,338, filed on May 2, 2001.

(51) Int. Cl.[7] .................................................. C02F 1/28

(52) U.S. Cl. ....................... 210/667; 210/679; 210/691; 210/767; 210/803; 210/222; 210/263; 502/406; 428/402; 428/403; 428/407

(58) Field of Search ................................ 210/667, 679, 210/615, 616, 695, 691, 767, 807, 222, 263, 645; 502/406; 428/402, 403, 407

(56) References Cited

U.S. PATENT DOCUMENTS 2,093,454 A 9/1937 Kistler
3,117,027 A 1/1964 Lindlof et al.
3,864,124 A 2/1975 Breton et al.
3,897,221 A 7/1975 Salyer et al.
4,144,373 A * 3/1979 Weiss et al. ............. 252/62.54
4,349,456 A 9/1982 Sowman
4,454,234 A 6/1984 Czerlinski
5,262,199 A 11/1993 Desu et al.
5,352,517 A 10/1994 Clough et al.
5,559,065 A 9/1996 Lauth et al.
5,641,622 A * 6/1997 Lake et al. .................... 435/2
6,027,945 A 2/2000 Smith et al.
6,471,876 B1 10/2002 Hansen et al.

* cited by examiner

*Primary Examiner*—Robert A. Hopkins
(74) *Attorney, Agent, or Firm*—Foley & Lardner LLP

(57) ABSTRACT

Buoyant, sphere-like materials on the order of about 10 to about 300 microns and surrounded, at least in part, by (1) a variable blend of a ferromagnetic and paramagnetic material and (2) an absorbing or adsorbing material are effective vehicles for isolating targeted materials. By virtue of its relatively low density, the composite material is capable of remaining sufficiently suspended in solution for a suitable amount of time. In addition, the blend of ferromagnetic and paramagnetic materials allows for the isolation of a composite material from an environment such as a solution, yet discourages substantial self-attachment of the composite materials in solution, when subject to a magnetic field. Accordingly, multiple embodiments of composite materials having these and other properties are disclosed, as well as methods for making and using the same.

37 Claims, 5 Drawing Sheets

M= Magnetization
$M_r$= Remanent magnetism
$H_c$= Coercivity
H= Applied field

COMPOSITE PARTICLES

This application is a Continuation In Part of Parent U.S. patent application Ser. No. 09/846,338 filed on May 2, 2001 in the U.S. Patent and Trademark Office.

BACKGROUND OF THE INVENTION

1. Field of the Invention

The present invention relates to materials and methods for contacting a solution with a substrate and separating the substrate from the solution. More specifically, the present invention relates to composite micro-sized, magnetic particles for use in extracting desirable or undesirable components from a suspension or solution.

2. Description of the Related Art

Current methods for separating biological materials from impurities and/or suspending media employ the use of very fine magnetic particles that have coated thereon an active separating material. In this context, it is desirable that the magnetic materials possess at least two physical properties, namely, (1) a proper combined mass and size and (2) paramagnetic qualities. The former property will allow the particle to settle more slowly in suspension, thereby enhancing the particles' exposure to and interaction with the suspension. Thus, the smaller they are, the more slowly the particles will settle out according to Stokes Law and the effects of Brownian motion in the case of ultra small particles. The latter paramagnetism property allows the particles to be subsequently removed from the suspension by application of a magnetic field and for example, decanting off the suspending liquid. Since the particles are paramagnetic they will not have had induced residual magnetism and with the field removed, can be re-suspended in yet another recovery medium if necessary without clumping together.

Accordingly, current practice involves the use of very fine paramagnetic particles, consisting of iron oxide and silica composites, some of which are coated and others are mixtures. These particles typically are on the order of 10 to 100 nanometers, for example, and are suspended directly in a solution or suspension containing the nucleic acid or other molecules capable of being extracted from the suspension. Generally, these nano-sized particles contain a coating of an "active" material, that is, a material that has an affinity for a desired material already in suspension or solution. The coated magnetic particles are then separated from the suspension by application of a magnetic field.

Once the desired material in suspension has bound to the active material that is coated on the nano-sized particles, the particles are removed from the suspension. These bound materials can be removed by dissolution with reagents. However, these nano-sized particles often are too minute to separate completely from the suspension. Further, the high surface area of the fine particles increases their own susceptibility to dissolution as well, thus adding an impurity to the extracted media. Thus, a substantial concentration of these particles may remain in suspension and are lost in waste streams. Still further, undesirable clumping may occur when nucleic acid molecules attach to multiple magnetic particles, which are of comparable size, forming chains or large groups of the two. As a result, it is difficult to obtain desirable amounts of material that may have adhered to the particles. For the particles that actually are separated from suspension, multiple successive rinsing steps with extractive solutions are required.

Therefore, there is a present need for larger particles, for example, particles on the order of a sub-micron size to tens of microns, which would perform the function of material removal at high yield and be magnetically separable. By virtue of their size, micro-sized particles meeting these criteria could be separated from suspension more easily than nano-sized particles. Accordingly, the use of these particles would facilitate robotic manipulation of the separation process.

However, an increase in the diameter of these sphere-like particles disproportionately increases their mass, typically resulting in an increased rate of settling out of suspension. Further, agitation such as by stirring to maintain suspension may damage the delicate bio-substances. Hence, there is also a need for a gentle means to keep the particles suspended for times sufficient to allow the desired removal processes to take place.

SUMMARY OF THE INVENTION

Accordingly, it is an object of the invention to provide a micron-sized composite particle that is capable of interacting with a targeted material from solution, yet does not settle out of suspension at a rate typically associated with conventional micron-sized particles.

It is a further object of the invention to provide a micron-sized composite particle that is capable of isolating a targeted material from solution, yet does not settle out of suspension at a rate typically associated with conventional micron-sized particles.

It is, therefore, another object of the invention to provide a micron-sized composite substrate having (1) paramagnetic properties; (2) materials whose properties are designed to separate the desired substances from the suspension; and (3) to provide the buoyancy necessary to retard settling time for the extraction media to remove the desired substances.

These and other objects of the invention will become apparent upon reading the disclosure and teachings set forth herein.

In a compositional sense, the invention provides a composite material having an admixture of at least one buoyant particle, a variable blend of magnetic material that is susceptible to an induced magnetic field, and an active material. In one preferred embodiment, the above composite material is suitable for holding the composite in suspension in a fluid for a selected length of time and the active material is capable of adsorbing and/or reacting with at least one substance in the fluid and has a size on the order of about 10 μm to about 300 μm.

The individual components of the inventive composite material can be constructed in a number of ways. For instance, the variable blend of magnetic material can be chemically vapor deposited or wash-coated on the buoyant particle, and the active material can be chemically vapor deposited or applied via a sol gel process. In addition, the buoyant material may contain magnetic material incorporated therein, wherein the magnetic material is susceptible to an induced magnetic field.

A composite material of the invention can be used in conjunction with many different technologies. For instance, the composite material can be used to extract a biological material from a solution. The composite material also can be used to separate an impurity from a fluid.

In a methodological sense, the invention provides a method for extracting a biological material or impurity from a solution, including the steps of: providing a composite material separation medium containing one or more buoyant particles, a variable blend of magnetic material, and a material having an affinity for the biological material or said impurity; contacting the separation medium with a solution containing the biological material or impurity, wherein at least a portion of the biological material or impurity is bound to the material having an affinity therefor; removing the separation medium containing the bound biological material or impurity from the solution; and separating the bound biological material or impurity from the separation medium.

The present invention also includes a method of controlling the time of suspension of an active material in a fluid, containing the steps of: providing a composite material as described herein; contacting the composite material with a fluid in an amount sufficient to suspend the composite material, whereby the amount of time the active material is suspended depends on the overall density of the composite material in accordance with Stoke's Law.

DETAILED DESCRIPTION OF THE PREFERRED EMBODIMENT

Figure 1:
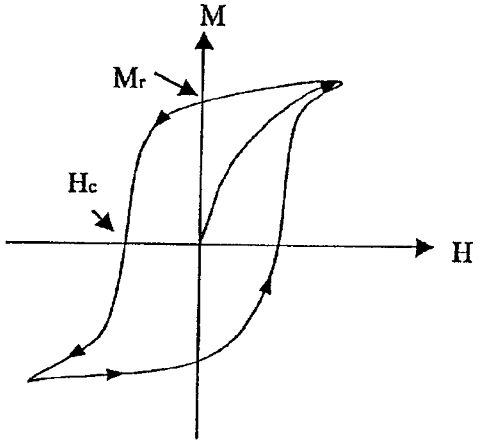
FIG. 1 is a graph illustrating that the remanent magnetism is a function of the amount of paramagnetic and ferromagnetic material in a composition.
Figure 2:
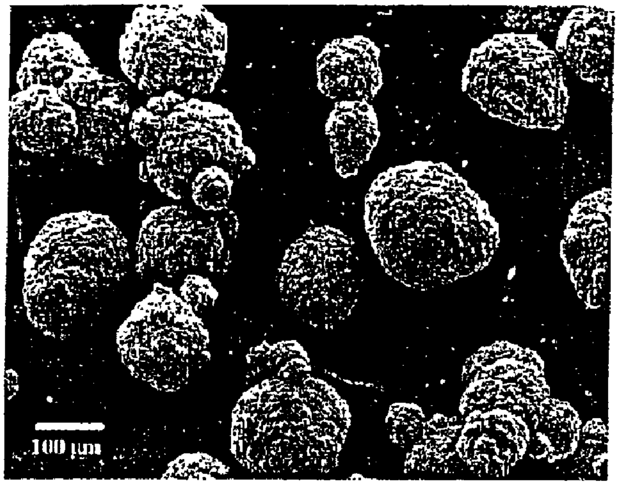
FIG. 2 is a Scanning Electron Microscope (SEM) view showing the composite powder of $Fe_2O_3$ and glass bubble coated with $TiO_2$.

The present invention provides, inter alia, a micro-sized composite particle comprising a buoyant material, a magnetic material and an active material, the composite particle being suitable for extracting a targeted material from a suspension. The present inventors have overcome the shortcomings of the prior art, by presenting the magnetic material in admixture with a buoyant material and an active material. To this end, the buoyant material acts to lower the overall density of the composite material, while substantially maintaining the properties of the magnetic and active materials. The relatively low density allows the composite particle to remain suspended in the liquid for a length of time suitable for absorbing, binding to, or interacting with, a desired material in suspension.

In addition, a coating of active (e.g. ceramic) material, preferably of high surface area, is applied to the composite magnetic and buoyant material. In one embodiment, the composite particle of the invention presents a very high surface area to the targeted material, for example, by providing a reticulated labyrinth of microporous material on fine struts that define walls bounding the pores. On, or within pores of, these struts may be deposited a nanoporous active material. Accordingly, the struts can serve to present an active material to one or more targeted materials.

Components of the Composite Particle

The invention provides a composite particle comprising in admixture a buoyant material, a magnetic material, and an active material. In a preferred embodiment, the composite particle has an overall density less than the density of the magnetic or active components, alone, and an overall size on the order of about 10 μm to about 300 μm. The following is a non-limiting description of the components that are comprised in the composite particle.

Buoyant Material

The function of the buoyant material is to control the bulk density of the composite particle. For instance, the buoyant material is able to present the composite material to one or more targeted materials, e.g., biological materials in suspension or other medium, such that the active particle is exposed to the targeted material for a greater period of time or to a greater extent than in the absence of the buoyant material, without the need for stirring or other damaging (violent) agitation.

In one aspect, the buoyant material is particulate in form. To this end, the buoyant particle preferably may confer an overall bulk density of the composite particle up to about 15% greater than the specific gravity of a fluid or liquid in which the composite material can be suspended. The buoyant particle, by itself, has a density of less than 1 $g/cm^3$ and, more preferably, between about 0.3 and 0.7 $g/cm^3$. In an even more preferred embodiment, the density of the buoyant particle is about 0.5 $g/cm^3$. As further described herein, the invention also contemplates a buoyant particle that comprises, in admixture, a buoyant material and a magnetic material (or variable blend thereof). According to this embodiment, the bulk density of the composite particle preferably is up to about 15% greater than the specific gravity of the fluid or liquid in which the composite material can be suspended. In a preferred embodiment, the fluid is aqueous and the bulk density of the composite particle preferably is between about 0.9 $g/cm^3$ and 1.2 $g/cm^3$ and, most preferably, about 1.04 $g/cm^3$.

The buoyant particle can be made up of any material capable of being adapted to possess the aforementioned properties, e.g., size and density, inasmuch as the selected buoyant particle is capable of fusing with, or otherwise attaching to, or being integral part of, the magnetic and/or active particles according to the invention, which is discussed in greater detail, below. For instance, the buoyant particle may be selected from the group consisting of ceramics such as glass, aluminum oxide, or titanium dioxide and may include magnetic oxides as part of their composition. In addition, the buoyant particle can be a low-density polymer, such as a polymer formed from polystyrene or polypropylene. It will be appreciated that the buoyant particle may comprise one of the aforementioned materials or a blend thereof.

The buoyant material can be spherical or substantially spherical in shape, containing an exterior surface that defines a hollow region therein. However, the shape of the buoyant particle can be varied without departing from the scope of the invention. According to one embodiment-for example in a separation of a biological material (e.g. nucleic acid, protein, or cell) from a fluid-the spherical or substantially spherical buoyant material preferably has a size on the order of 10 μm to 100 μm in diameter. In yet other embodiments, the spherical or substantially spherical buoyant material can have a size on the order of about 5 μm to about 100 μm in diameter.

Other spherical or substantially spherical particles, suitable for use in the present invention, are available from various vendors such as Minnesota Mining and Manufacturing Company under the trade name of SCOTCHLIGHT BRAND GLASS BUBBLES™, types B, K, L, and S.

Figure 7:
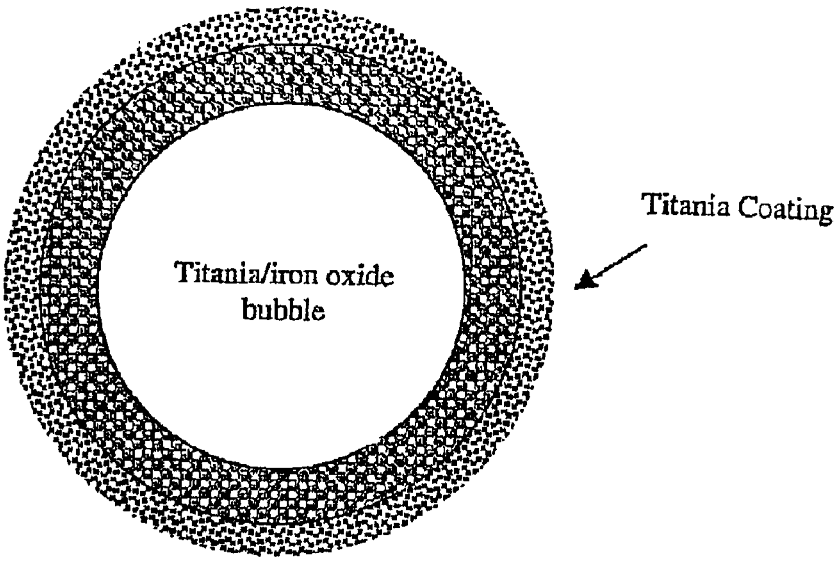
FIG. 7 depicts a composite particle arrangement where the buoyant particle has both titania and iron oxides as the magnetic material and is further coated with titania.

The buoyant particle also may be a hollow ceramic micro-balloon, such as titania, that may incorporate iron oxide in its composition. U.S. Pat. No. 4,349,456—which hereby is incorporated by reference in its entirety—provides general guidance for producing a particle of this type. According to one embodiment, a ceramic bubble comprising, for example, in part titanium oxide and in part iron oxide, exhibits dual functions of buoyancy and paramagnetism. The surface of this buoyant/paramagnetic particle can be coated with a high surface area ceramic, e.g., sol-derived titanium oxide, that can be heat treated at lower temperatures to produce the composite particle with high surface area. A schematic drawing according to a preferred aspect of this embodiment is shown in FIG. 7 where the bouyant/paramagnetic particle is a titania iron oxide combination and the active material is a titania coating.

Importantly, the buoyant material does not have to be a hollow particulate substance or a plurality of hollow particulate substances in association with each other. For example, the buoyant material may be a foam or foam-like in form, provided that the density of the composite material can be controlled to meet the density requirement.

Magnetic Particles

The invention also employs, in admixture, a variable blend of ferromagnetic (i.e. magnetite) and paramagnetic (i.e. hematite) materials as the magnetic material, which is susceptible to an induced magnetic field. To this end, the variable blend is proportioned such that the magnetic particles are sufficiently magnetic so as to be attracted to a magnetic field, yet not inherently magnetic to a degree that will cause the particles to self-agglomerate and clump adhere to each other. As used herein, a material is "paramagnetic" if it does not possess a magnetic field, but is attracted to a magnet. In contrast, a "ferromagnetic" material is one that inherently possesses a magnetic field (e.g. can be attracted to a magnetic field and also is capable of attracting another magnetic material).

Thus, a suitable magnetic material, according to the invention, is one that loses or substantially loses its residual magnetism after an external magnet is removed from its presence. In a particular embodiment, the magnetic material is a paramagnetic material or particle, which is characterized by the absence of any measurable permanent magnetization. For example, the magnetic material can be one of or a mixture phases of $Fe_2O_3$ and $Fe_3O_4$.

Figure 3:
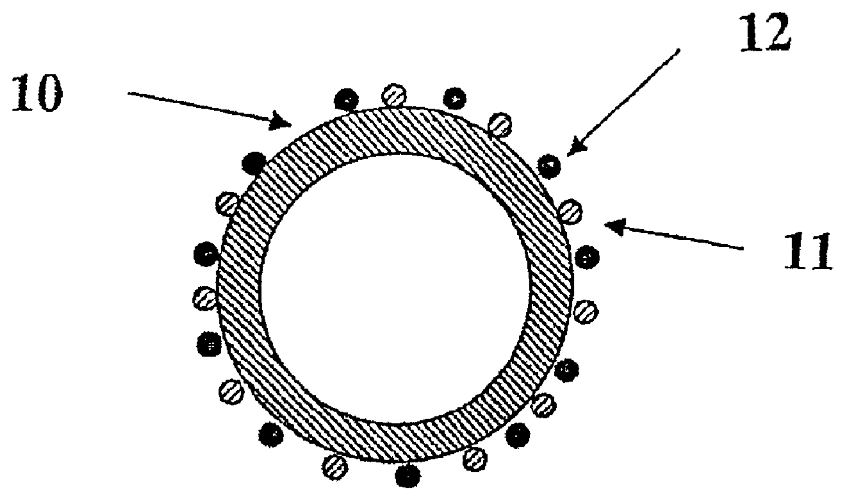
FIG. 3 shows one possible arrangement of magnetic material on a buoyant particle, when the buoyant particle is about 50 μm in cross section.
Figure 4:
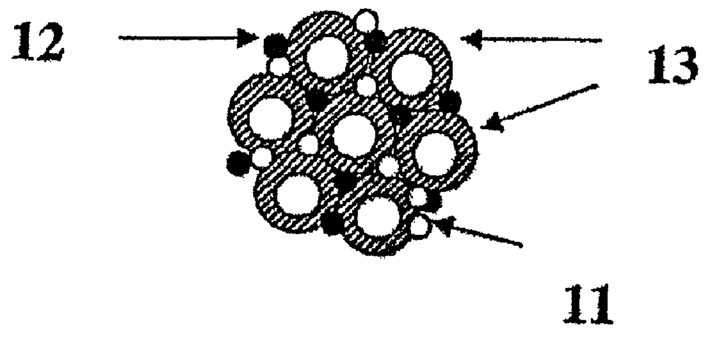
FIG. 4 shows one possible arrangement of magnetic material on a buoyant particle, when the buoyant particle is less than 50 μm in cross section.

The variable blend of magnetic materials can comprise microparticles. The ratio of the selected paramagnetic and ferromagnetic materials can be adjusted, for example, by heat treatment of a magnetic material in a partially reducing atmosphere. In addition, the selected ratio of paramagnetic:ferromagnetic material can be modified either before or after the magnetic material is attached to a buoyant material or particle. FIGS. 3 and 4, for example, are representative embodiments of an arrangement of paramagnetic 11 and ferromagnetic 12 materials on a buoyant particle 10 or plurality thereof 13. As shown by the contrast between FIGS. 3 and 4, the configuration of the magnetic and buoyant materials can vary, depending on the cross-section length of the buoyant particle(s).

Paramagnetism and superparamagnetism can be obtained, for example, by using magnetic materials of very fine size (e.g. sub-micron). By using coarser particles, practically it is difficult to achieve such magnetic properties. For instance, ferromagnetic particles tend to retain remanent magnetism (which would promote agglomeration of magnetic particles in a suspension) after the removal of a magnetic field. On the other hand, a paramagnetic particle would not retain any remanent magnetism subsequent to the removal of an applied magnetic field, i.e., Mr=0, as shown in FIG. 1.

Ferric oxide, $Fe_2O_3$, is known to exist in at least three forms, alpha, beta, and gamma. Of these, only the gamma phase is magnetic; hence, its common application in magnetic recording media. Gamma phase ferric oxide may be obtained by oxidizing $Fe_3O_4$ or dehydrating γ-FeOOH. However, γ-$Fe_2O_3$ is unstable above a certain temperature (approximately 370° C.), depending on preparation process and doping action. Accordingly, at such high temperatures, magnetic γ-$Fe_2O_3$ undesirably may transform to antiferromagnetic γ-$Fe_2O_3$.

However, this oxidation process can be controlled by (1) adding hematite (i.e. paramagnetic material) or (2) firing under a controlled atmosphere-each of which results in a combined weak ferromagnetism and antiferromagnetism on the surface of the composite particles. This combination prevents agglomeration and/or clumping, while maintaining desired attraction to an external magnetic field.

The magnetic properties of the coated particle can be tailored, e.g., in a furnace with a controlled atmosphere. The desired magnetic properties are such that the composite materials behave very similarly to an ideal paramagnetic material. Various reducing atmospheres such as vacuum, hydrogen, carbon monoxide, or an admixture of the above can be used, according to methods known in the art, to improve the paramagnetic properties of the said particles.

According to the invention, a suitable magnetic material also is capable of being fused, or otherwise attached to, a buoyant particle and is capable of supporting a separate, "active" material, as described in greater detail below. It is preferred that the magnetic material is insoluble, unreactive, or is substantially unreactive with reagents used to separate the target material from the composite particle. In this sense, the reagent may be an acid or a base and/or other chemical agents.

In one embodiment, the magnetic material may comprise one or more spherical or substantially spherical particles, which can be attached to at least one buoyant particle. The dimensions of a composite particle of the invention, having (1) one each of or (2) an aggregate of buoyant and magnetic particles are between about 10 μm and 300 μm. Accordingly, the magnetic particles can range in size from about 5 μm to about 200 μm. In addition, any given magnetic particle may be attached to the buoyant material and/or another magnetic particle or particles.

The spherical or substantially spherical magnetic particle can be porous in shape, having an external surface area and a network or labyrinth of struts, which form open channels that define internal surfaces. These internal surfaces may have attached to them, for example, a coating of active high surface area material. Thus, this active material is supported on the struts of the magnetic materials in fluid communication with solutions external to the composite in the suspension. Preferably, the magnetic particle will have a surface area of greater than 1 $m^2$/gram of magnetic material.

In this sense, the porous magnetic particle can be analogized to a "carrier," preferably having a substantially spherical outer surface, with interconnecting pores that provide fluid flow openings and extend throughout the sphere. The porous carrier has a plurality of continuous strong supportive struts defining walls bounding the pores, the pores preferably having a mean size between about 0.1 and about 10 microns.

The open channels, e.g., pores, of the magnetic material can exist in a reticulated, open, sintered magnetic structure. In this sense, a "reticulated" structure is a structure made up of a network of interconnected struts that form a strong, interconnected three-dimensional continuum of pores. A suitable method for preparing a sinterable structure is disclosed in pending application Ser. No. 09/286,919, entitled, "Sinterable Structures and Method," which is hereby incorporated by reference in its entirety. More specifically, this application describes a process for producing a porous, sintered structure, comprising (1) preparing a viscous mixture comprising a sinterable powder of ceramic or metal dispersed in a sol of a polymer in a primary solvent; (2) replacing the primary solvent with a secondary liquid in which the polymer is insoluble, thereby producing a gel which comprises an open polymeric network that has the sinterable powder arranged therein on interconnected fibrils; (3) removing the secondary liquid from the gel; and (4) sintering the sinterable powder to form the open, porous structure.

In this embodiment, the magnetic particle or a plurality thereof then may be attached to one or more buoyant particles. The attaching of a magnetic and buoyant particle may be accomplished by heating the components to a temperature sufficient to melt or soften the exterior of the buoyant particle, which enables a magnetic particle in contact with a buoyant particle to fuse or sinter-bond thereto. To obtain a desired ratio of ferromagnetic and paramagnetic material, as discussed above, the fused particle can be heat-treated in an atmosphere of hydrogen gas and an inert gas such as argon at a concentration of about 1 to 5% for a sufficient amount of time that will become apparent to one of ordinary skill in the art. Alternatively, the magnetic materials can be attached to the buoyant material by an organic "adhesive," such as a high temperature polymer.

As described in more detail, below, an "active" material can be nested within and structurally supported by the pore walls of the porous carrier. The active material may also be porous, having a mean pore size that is at least an order of magnitude less than the mean pore size of the porous carrier. In this way, the pores of the active material are exposed to the fluid flow openings of the porous carrier and are accessible to a fluid or gas flowing through the pores of the carrier.

Alternatively, the magnetic material, which may be porous, can be attached to a buoyant material during the process of synthesizing the magnetic material, itself. In this context, the magnetic material may comprise a mixture of a sinterable ceramic powder and a cellulose binder. The combination of magnetic and buoyant materials than can be subjected to a spray-drying process, which additionally bonds the buoyant material and magnetic material. This composite can be heated to burn off the cellulose and sinter bond the materials. In this way, the density of the composite particle still can be controlled and an active material still can be applied thereto.

In another embodiment, according to the invention, the magnetic particle preferably is on the order of about 0.1 μm to about 10 μm in size and is "wash coated," or painted, onto one or more buoyant particles. The coating can be applied using a fluidized bed technology such as that described in U.S. Pat. No. 3,117,027, incorporated herein by reference. Organic binder and adhesives can also be used to improve the attachment of magnetic particles on the surface of bouyant particles.

The physical characteristics of the magnetic material coating can vary without departing from the invention. For example, the coating of magnetic material on the buoyant particle may range from a thin coat (e.g. about 0.1 μm) to a thick coat (e.g. up to about 10 μm). In addition, the coating thickness may or may not be uniform over the surface area of a buoyant particle. Also, the exterior of the magnetic material coating can range from smooth to lumpy, or textured. A coating with high surface area is desirable since it provides high surface area for adsorption and increases binding capacity of the composite particles. In a preferred embodiment, the exterior of the coating is highly porous.

It also will be appreciated that the wash coating of magnetic material can be applied over the entire surface area of a buoyant particle; or the magnetic material can be applied over a portion, or portions thereof. As described in greater detail, below, if the wash coating of magnetic material covers the entire surface area of the buoyant particle, then the active material is applied to the magnetic material. If, on the other hand, the magnetic material coats only portions of buoyant particle, then the active material may be applied to the exposed surface of the buoyant particle and/or the magnetic material, itself. It is preferred that the selected magnetic material is capable of having an active material adhered, or otherwise attached, thereto by a sol gel procedure, for example, or a chemical vapor deposition ("CVD").

The invention also contemplates a magnetic material that is applied to one or more buoyant particles via a CVD procedure. To this end, the magnetic material, upon CVD deposition on a buoyant particle can be on the order of about 100 nm to 10 μm. U.S. Pat. No. 5,352,517, hereby incorporated by reference in its entirety, describes methods for chemical vapor depositing a magnetic material onto a substrate. A general description of CVD processes can be found in Pierson, HANDBOOK OF CHEMICAL VAPOR DEPOSITION (CVD): PRINCIPLES, TECHNOLOGY, AND APPLICATIONS. ISBN: 0815513003, Noyes Data Corporation/Noyes Publications (June 1992); or Klaus K. Schuegraf, Ed. HANDBOOK OF THIN-FILM DEPOSITION PROCESSES AND TECHNIQUES: PRINCIPLES, METHODS, EQUIPMENT, AND APPLICATIONS. ISBN: 0815514220, Noyes Data Corporation/Noyes Publications (March 1998)—both references which are incorporated by reference. These methods readily are adapted for use in accordance with the present invention. In additional, U.S. Pat. Nos. 5,352,517 and 5,262,199 each teach methods for CVD deposition of iron oxide on various substrates. These patents are incorporated by reference in their entirety.

The physical characteristics of the magnetic material that is chemically vapor deposited can vary, without departing from the invention. For example, the CVD coating can range from fully (i.e. 100%) dense to micro porous. In a preferred embodiment, the exterior of the coating is not fully dense. That is, the coating can have pores on the order of 10 nm to 2 μm in mean diameter. The coated particles can be subsequently subjected to controlled atmosphere heat treatment in order to optimize its paramagnetic properties.

The active material then can be applied to the buoyant particle and/or magnetic material via a CVD or a sol gel procedure, as further described, below.

Active Materials

The active material according to the invention is a material that is capable of interacting with a targeted substance in solution, or providing a sufficient substrate for another material that will interact with the targeted substrate. As described more in-depth below, interacting with a targeted substance may include, among other things, extracting or removing desirable or undesirable materials from a medium, or catalyzing reactions. In a separation aspect of the invention, a suitable "active" material is that part of the composite material that 1) has an affinity for one or more substances in the medium from which separations are to occur or 2) provides a substrate on which a linking or reactive substance is attached that will in turn provide that affinity. The substances to be separated may be undesirable materials such as impurities or more likely, desired materials that are to be used for analysis or collected for other purposes.

An active material, according to the invention, preferably provides a high surface area base on which to deposit coatings of chemicals or other targeted material that can attract desired biomolecules. Examples of such coatings materials are: streptavidin, biotin, guanidine, and various conventionally known chemicals having carboxyl groups, hydroxyl groups, and/or other ligands suitable for attracting nucleic acids, proteins, or cells.

The invention contemplates numerous types of materials can comprise an active material. For example, a suitable active material for use in the present invention can be selected from the group consisting of transition metal oxides, silica, titania, hydroxyapatite, zirconia, alumina, magnesia, and a variable blend thereof. In a preferred embodiment, the active material is titania ($TiO_2$). However, the invention also contemplates active materials other than those expressly disclosed herein. For example, the active material can be a catalyst for a reaction. In this sense, the active material may comprise a catalyst and the magnetic material also may comprise a second, synergistic catalyst or other factor that, though present in a lesser amount than the catalytic active material, may be critical or essential to the desired reaction. U.S. Pat. No. 5,559,065, also incorporated by reference, provides descriptive methods applicable to the instant invention. In applications where toxicity is not a concern, such as non-bioseparation applications, oxides of elements such as manganese and copper can be employed.

Applicants have found that by using some metal oxides, such as titania, the stoichiometric ratio of metal atoms (e.g., titanium) to oxygen atoms can be controlled, such as by using a reducing firing atmosphere. By controlling the stoichiometric ratio, the net charge on the surface of the composite particles can be altered. By changing the net charge of the particle in this fashion, attraction or holding of added biomolecules such as the streptavidin, biotin, guanidine, and various conventionally known chemicals having carboxyl groups, hydroxyl groups, and/or other ligands described above can be modified, which, in turn, will better attract and/or hold nucleic acids, proteins, etc. in the separation process. Other metals having multi oxidation states can have their stoichiometric ratio modified such as zinc, iron, tin and bismuth. Other elements can achieve an oxide structure having oxygen defects (i.e., non-stoichiometric) through doping techniques well known in the art. As noted above, if toxicity is not a concern, metals such as manganese and copper can also have the stoichiometric ratio of metal atoms to oxygen atoms altered. What is considered toxic, of course, depends on the conditions under which it is used. One consideration that can impact on whether a particular active material is considered to be toxic is the presence or absence of leaching into the surrounding medium.

A desired oxygen to metal ratio can vary widely and depends on the particular application. For example, for metal oxides normally having a stoichiometric formula represented by $MO_2$, where M is a metal atom, can have the stoichiometric ratio modified to $MO_x$, where $1.980 \leqq x \leqq 2.015$, preferably $1.985 \leqq x \leqq 2.010$ with $x \neq 0$ in the case where a non-stoichiometric ratio is desired. For some metal oxides, such as titania, the stoichiometric ratio of oxygen to metal can only be reduced. In such a case, the stoichiometric ratio can be $1.80 \leqq x \leqq 2.0$, preferably $1.985 \leqq x \leqq 1.99$. The change in the stoichiometric ratio to an excess of metal, such as titanium, can be accomplished by any known methods. For example, to reduce the oxygen oxidation state, the metal oxide can be heated in a reducing atmosphere, preferably a partial hydrogen atmosphere, for a time and at a hydrogen concentration sufficient to accomplish the desired reduction. Any other methods known in the art could also be used.

Figure 5:
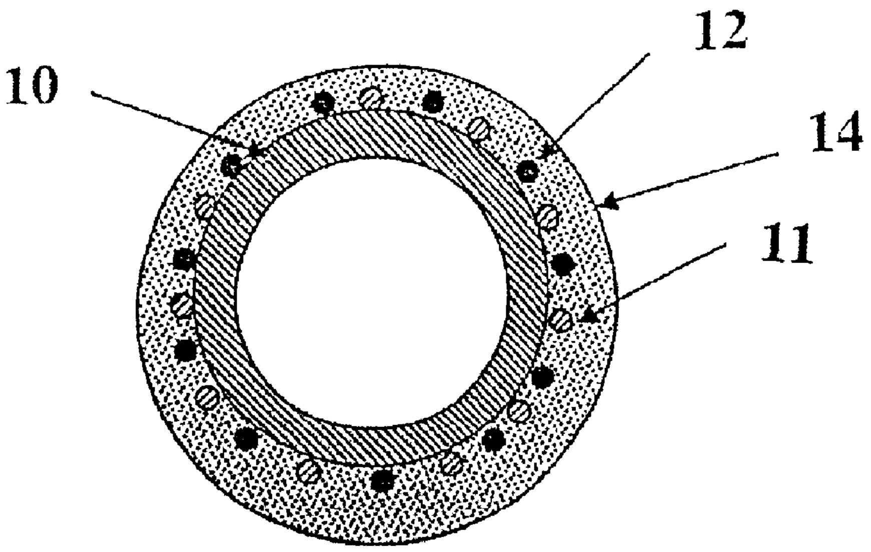
FIG. 5 depicts a composite particle arrangement, as described in FIG. 3, that further is coated with an active material.
Figure 6:
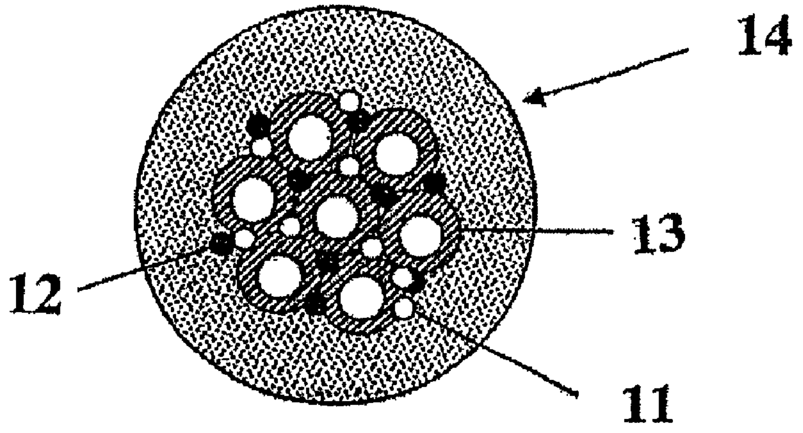
FIG. 6 depicts a composite particle arrangement, as described in FIG. 4, that further is coated with an active material.

An active material for use in the present invention can be deposited on or attached to the magnetic material and/or buoyant particle. If the magnetic material is porous, as described above, the active material may fit inside of the one or more pores of the magnetic material and, thus, have a surface area that is greater than 1 $m^2$/gram of magnetic material. In other words, in a preferred embodiment, the magnetic material is microporous and the active material is able to fit inside the pores or is coated on the struts. Thus, the active material is capable of reacting with, adhering to, or otherwise being deposited on the surface of the channels, as well as the exterior surface of magnetic material. FIGS. 5 and 6 are representative schematic drawings that depict a coating of active material 14 on an embodiment according to FIGS. 3 and 4, respectively.

The active material, itself, can be a porous material. Preferably, the pores of the active material are "nano-porous" in size, for example, about 1 to about 100 nm in mean diameter. The pores function, inter alia, to increase the surface area that is presented to a targeted substance or to a coating that will be applied to interact with a targeted substance, such as attracting a targeted biochemical, and can confer a surface area greater than 20 $m^2$/gram, preferably greater than 100 $m^2$/gram of active material, and more preferably greater than 100 $m^2$/gram and up to 500 $m^2$/gram of active material.

Methods for impregnating a micro-porous "carrier" particle with a nano-porous silica (i.e. active) particle include and are disclosed, e.g., in Examples 1–5 of co-pending application Ser. No. 09/375,887, entitled, "Supported Porous Materials," which is hereby incorporated-by-reference in its entirety. In one embodiment, a micro-porous magnetic particle first is formed, essentially as described above; thereafter, the porous active material can be fabricated in situ, that is, within channels of the magnetic particle. For example, the titania sol can be deposited into the microporous magnetic material which forms nanoporous active materials. For example, one ml of titanium isopropoxide is mixed very slowly with five ml of stirring de-ionized water. This solution then is dried in air to form a gel which contains about 63 wt. % of titanium oxide. This gel can be dissolved in water that produces colloidal titanium oxide which can be applied on the surface of buoyant material or can be used to impregnate the porous structure of the microporous ceramic products. A porous coating with high surface area is obtained by drying and firing the coated particles. The surface area of titanium oxide coating is decreased by increasing the firing temperature. Firing at 600° C. will provide a dense coating while 300° C. firing resulted in a porous with surface area as high as 150 $m^2/g$ coating. In this regard, see U.S. Pat. No. 2,093,454, which is hereby incorporated by reference.

The active material also may be applied to the composite particle via a CVD process. To this end, the active material is deposited in essentially the same manner as described for CVD of the magnetic material. The active material may be deposited on the chemically vapor deposited or wash coated magnetic material and/or the buoyant material. Preferably, the buoyant material and magnetic material already are attached to each other before the active material is added to the composite particle.

The active material also can be applied to the composite particle via a sol gel procedure using, for example, conventionally known fluidized bed coating technologies. This procedure entails the preparation of a "sol" that contains the starting materials in appropriate concentrations. As used herein, "sol" refers to a colloidal dispersion in which the particles are on the order of about 1 to about 1000 nm. The invention contemplates the use of either colloidal sol-gels or polymeric sol-gels. Colloidal sol-gels are prepared using colloidal particles, whereas polymeric sol-gels are prepared from organometallic precursors such as metal alkoxides. Most metal alkoxides are soluble in alcohol or other organic solvents. Sol preparation involves the hydrolysis of a metal alkoxide followed by polycondensation.

Hydrolysis:

M(OR)x+xH2O=M(OH)x+xROH

Polycondensation:

M—OR+M—OH=M—O—M+R—OH

M—OH+M—OH=M—O—M+H2O

The rate of polycondensation depends on: the acid or base catalyst (monodentate or bidentate); the shape and size of the R-group (steric hindrance); and the metal ion (valency).

The formation of the gel occurs when the sol is aged by heating or by the evaporation of water. The oligomeric colloidal particles coagulate and polymerize, forming a dense rigid M—O—M network that encloses the solvent.

After application of the active material, if desired, the net charge on the surface of the composite particle can be adjusted by methods known in the art. For example, if the oxygen in the metal oxide is to be reduced, the reduction can be accomplished by reducing in a hydrogen atmosphere, as described above.

Methods for Using the Composite Particle

The composite particle of the invention is suitable for use in any number of applications, including extracting desirable bio-organic molecules from a medium, removing undesirable materials from a medium such as plasma and catalyzing reactions. The applications described herein are illustrative and do not limit the contemplated uses of the composite particle.

Accordingly, the invention provides, inter alia, a method for extracting a targeted biological material or impurity from a solution or dispersion (i.e. suspension). This method entails contacting a composite material, as described herein, with a solution containing the targeted biological material or impurity and allowing the targeted material to attach to the active material of the composite material. Thereafter, the targeted material can be separated from the composite material, using techniques such as those described herein. As noted, the buoyant material can control the bulk density and, thus, the settling rate of a composite material in suspension or other medium. Accordingly, the invention provides a method for separating a targeted material from solution or dispersion (i.e. suspension), wherein the process of attracting a targeted material to the composite material does not require harmful agitation of the solution or dispersion, and wherein the amount of time the active material is suspended depends on the overall bulk density of the composite material.

The targeted material can be obtained from eukaryotic or prokaryotic cells in culture or from cells obtained from: tissues; multi-cellular organisms, including animals and plants; body fluids, such as blood, lymph, urine, feces, or semen; embryos or fetuses; food stuffs; cosmetics; or any other source of cells. The types of DNA and RNA suitable for use in with the present invention can be obtained from an organelle, virus, phage, plasmid, or viroid that can infect cell. To obtain the DNA or RNA, a cell may be lysed and the lysate can be processed, according to conventional means, to obtain an aqueous solution of DNA or RNA. The methodology of the present invention then may be applied to this DNA or RNA. In addition, the DNA or RNA typically can be found with other components, such as proteins, RNAs (in the case of DNA separation), DNAs (in the case of RNA separation), or other types of components. U.S. Pat. No. 6,027,945, which hereby is incorporated by reference, discloses methods for extracting bio-organic molecules from a suspension. The teachings of the '945 patent can be adapted for use in the context of the present invention.

In one embodiment, the composite particle of the invention is suitable for extracting a biological material from a solution. In this context, the active material is capable of attaching to, or interacting with, a nucleic acid, e.g., a plasmid DNA, protein, or other bio/organic material in a medium and comprises: providing a medium including the targeted material; providing a composite particle of the invention; allowing the formation of a reversibly binding complex between the composite particle and the targeted material by contacting the composite particles with the medium; removing the complex from the medium by application of an external magnetic field; and separating the targeted material from the complex by eluting the biological target material. As a result, the isolated targeted material is obtained and can be subject to quantitative and/or qualitative analysis.

In one embodiment, the composite particle is capable of reversibly binding one or more of several micrograms of targeted material per milligram of composite particle. The capacity of a composite particle for attaching the target material is determined, in part, by the amount of time the particle is able to remain in contact with, or close proximity to, the targeted material. Another factor is the composite particle's unique surface, which is presented for the interaction or incubation period. The surface area of the active component of the composite particle preferably is in a range of 5 to 500 square meters per gram, as measured by the BET method, but the effective area for attachment may vary from this, depending on the presence of different complexing agents and isolating media.

Following the "attachment" phase of the process, the composite particles—preferably along with a targeted material attached thereto—can be separated from their suspending media, e.g., by an applied magnetic force. For instance, the magnetic force can be used to attract the composite particles and the liquid suspending media then can be decanted. Subsequently, the composite and the attached targets can be washed and eluted to separate the targets from the composite.

The isolated targeted material then can be subjected to quantitative and/or qualitative analysis. If the targeted material is a nucleic acid, suitable techniques include, sequencing, restriction analysis, and nucleic acid probe hybridization. Accordingly, the data can be used to diagnose diseases; identify pathogens; and test foods, cosmetics, blood or blood products, or other products for contamination by pathogens. The data also are useful in forensic testing, paternity testing, and sex identification of fetuses or embryos.

If the targeted material is a protein, once eluted, the protein may be subject to any conventional technique or procedure suitable for separating, identifying and/or quantitating proteins. These techniques include chromatographic methods, such as high pressure liquid chromatography, and electrophoretic separation methods, such as capillary zone electrophoresis.

EXAMPLES

The following examples merely are representative and do not limit the embodiments that applicants regard as their invention.

Example 1

Chemical Vapor Deposition (CVD) of Titania (Active Material) on Porous Iron Oxide (Magnetic Material)

Twelve (12) grams of porous iron oxide were coated with titania in a fluidized bed. A 20 mm ID glass tube was used as the reactor. The iron oxide particles were fluidized by injecting two standard liters per minute of nitrogen gas through a water bubbler and into the bottom of the reactor. The iron oxide particles were heated to about 125° C. The titania coating was formed when 650 ml per minute of nitrogen gas passed through the titanium tetrachloride bubbler and injected into the top of the tube. After four hours of treatment, a porous coating of titania was obtained.

Example 2

Making the Titania Gel

Five parts of titanium isopropoxide was mixed slowly with one part of hydrochloric acid (37%). The above mixture poured into flat pan glass containers and left dried at room temperature for 24 hours when a water-soluble solid gel of titania was formed. The later was scraped off from the glass containers and collected as powder.

Example 3

Making the Titania Sol

One gram of the gel described in Example 2 was added to ten grams of deionized water and stirred for two minutes which resulted in a clear solution. For coating applications, one gram of the titania dissolved in 25 grams of deionized water.

Example 4

Making the Titania Bubbles

Droplets of the titania sol, as prepared in Example 3, were added into 100 mL of stirring n-Butanol and stirred for two minutes which resulted in the formation of titania bubbles having an average diameter of 50 μm. These bubbles were filtered using Whatman filter paper number 4 and left inside the filter paper to be dried at room temperature for 24 hours. The dried bubbles were then dried in oven at 75° C. for one hour, followed by sintering at 600° C. for one hour.

Example 5

Magnetic Titania Bubbles

Two grams of iron nitrate (III) nonahydrate and 3 grams of the titania gel, as prepared in Example 2, were added to 30 mL of deionized water, stirred for two minutes, filtered using Whitman filter paper number 4, added to 100 mL of stirring n-Butanol, and stirred for two minutes. The resulting bubbles were filtered, dried inside the filter paper for 24 hours, and fired as mentioned in Example 4. These bubbles were then heat-treated under reducing atmosphere to produce magnetic bubbles. The magnetic bubbles were coated in a fluidized bed with titania sol as described in Example 3 and heat treated between 150 and 300° C. to produce a high surface area titania coating.

Example 6

Titania Coated Glass Bubbles

About 0.2 gram of fine (<5 μm) iron oxide powder, one gram of glass bubbles with average particles size of 40 μm, and one gram of titania gel as prepared in Example 2 were dispersed in five mL of deionized water. This mixture was then dried at room temperature and fired at 350° C. This resulted in loosely attached and coated magnetic bubbles. These bubbles were carefully separated and classified.

(6-1) These glass bubbles were fluidized in a fluidized chamber; and the titania/iron nitrate (III) nonahydrate solution, as prepared in Example 5, were coated onto the glass bubbles. These bubbles then were heat-treated under reducing atmosphere to produce magnetic bubbles with a porous coating.

(6-2) Magnetic iron oxide was dispersed in a high temperature organic material, Matrimid 5218 from Cyba or resin 805 from Dow Chemicals Co. This dispersion then was coated onto the glass bubbles while fluidized as mentioned in (6-1). After drying this coating, a second coating of titania was applied on these bubbles, using the titania sol as prepared in Example 3. The thickness of each coating layer and the iron oxide content was calculated to result in an overall density of about 1 $g/cm^3$. The titania coating was heat treated at 300° C. for one hour in order to produce a porous coating.

(6-3) The example (6-1) also was practiced with the addition of silica sols such as Ludox® AS-30 to the titania sol prepared in Example 3 and coated on bubbles which resulted in coatings with 250 $m^2/g$ of surface area after being fired at temperatures as high as 300° C.

Example 7

Porous Iron Oxide

Fifteen grams of iron oxide powder with average particle size finer than 5 μm were dispersed in a N-methylmorpholineoxide/cellulose solution according to application Ser. No. 09/286,919. The above mixture then sprayed into water thus forming spherical iron oxide particles having an average particles size of 75 μm. After drying at 100° and sintering at 900° C., porous iron oxide beads were obtained. These powder particles were attached to four grams of glass bubbles having an average particle size of 40

$\mu$m and a density of 0.32 g/cm$^3$ using the high temperature polymers as mentioned in (6-2) and were coated with titania sol as described in Example 6.

Example 8

CVD Coating of Glass Bubbles

Commercially available glass bubbles with a true density of 0.60 g/cm$^3$ were coated with one micrometer coating of iron oxide using iron carbonyl through the CVD process in a fluidized bed system. These coated bubbles were then heat-treated at 300° C. under Ar-5%$H_2$ atmosphere to adjust for optimum paramagnetism. These magnetic bubbles were then coated with titania sol as prepared in Example 2 and heat treated obtaining a high surface area titania coating as explained in Example 5. The titania coating was also deposited through the CVD process using $TiCl_4$ and moist nitrogen.

While a number of preferred embodiments of the present invention have been described, it should be understood that various changes, adaptations and modifications may be made therein without departing from the spirit of the invention and the scope of the appended claims.

What is claimed is:

1. A composite material that is capable of being suspended in an aqueous fluid for removing at least one substance contained in the fluid, the composite material comprising:

at least one buoyant component that is buoyant with respect to said fluid;

a magnetic component that includes an amount of paramagnetic material that is sufficient to cause the magnetic component to be susceptible to an induced magnetic field; and an active component comprising a metal oxide having a stoichiometric ratio resulting in the composite material having a net charge, wherein the active component is active with respect to the at least one substance to be removed;

wherein at least one of the magnetic component and the active component is at least partially attached to the buoyant component, and the composite material comprises a sufficient amount of the magnetic component and the active component to adjust the bulk density of the composite material to more than the specific gravity of the fluid and no greater than about 115% of the specific gravity of said fluid.

2. The composite material of claim 1, wherein the metal oxide comprises the formula $MO_x$, wherein x is between 1.980 and 2.015.

3. The composite material of claim 1, wherein the metal oxide comprises the formula $MO_x$, wherein x is between 1.985 and 2.010.

4. The composite material of claim 1, wherein the metal oxide comprises the formula $MO_x$, wherein x is between 1.80 and 2.0.

5. The composite material of claim 1, wherein the metal oxide comprises the formula $MO_x$, wherein x is between 1.985 and 1.99.

6. The composite material of claim 1, wherein the metal oxide comprises an oxide of titanium, zinc, iron, tin, bismuth, manganese, copper, zirconium, or a combination thereof.

7. The composite material of claim 1, wherein the metal oxide is titania.

8. The composite material of claim 7, wherein titania comprises the formula $TiO_x$, wherein x is between 1.980 and 2.0.

9. The composite material of claim 7, wherein titania comprises the formula $TiO_x$, wherein x is between 1.985 and 1.99.

10. The composite material of claim 1, wherein the active component further comprises streptavidin, biotin, guanidine, or a combination thereof.

11. The composite material of claim 1, wherein the magnetic component comprises a ferromagnetic material and a paramagnetic material.

12. The composite material of claim 11, wherein the ratio of the ferromagnetic material and the paramagnetic material of the magnetic component is sufficient to discourage self-attachment of two or more of said composite materials in said fluid.

13. The composite material of claim 1, wherein the active component comprises a porous material having a mean pore size which is at least an order of magnitude less than the mean pore size of the porous magnetic material, and wherein the porous active material is located within the open channels of the porous magnetic material.

14. The composite material of claim 1, wherein the composite material comprises a sufficient amount of the magnetic component and the active component to adjust the bulk density of the composite material to be about 0.9 g/cm$^3$ to about 1.2 g/cm$^3$.

15. A method for extracting a substance from a fluid, the method comprising:

providing a separation medium comprising a composite material of claim 1 having an active component;

contacting said separation medium with a fluid containing said substance, wherein at least a portion of the substance is bound to the active component having an affinity therefor;

removing the separation medium containing the bound substance from the fluid; and separating the bound substance from the separation medium.

16. A method for extracting a biological material from a fluid, the method comprising:

providing a composite material according to claim 1;

contacting said composite material with a fluid containing a biological material for a sufficient period of time to permit at least a portion of the biological material to bind to the composite material;

removing the composite material containing the bound biological material from the fluid by application of a magnetic field; and separating the bound biological material from the composite material.

17. The method according to claim 16, wherein the active component of the composite material further comprises streptavidin, biotin, guanidine, or a combination thereof.

18. A method for extracting a biological material from a fluid, the method comprising:

providing a composite material according to claim 13;

contacting said composite material with a fluid containing a biological material for a sufficient period of time to permit at least a portion of the biological material to bind to the composite material;

removing the composite material containing the bound biological material from the fluid by application of a magnetic field; and separating the bound biological material from the composite material.

19. The method according to claim 18, wherein the active component of the composite material comprises streptavidin, biotin, guanidine, or a combination thereof.

20. A method of controlling the time of suspension of an active component in a fluid, the method, in sequential or non-sequential order, comprising:

providing a composite material according to claim 1;

contacting the composite material with a fluid containing a substance to be removed by the active component; and adjusting the amount of the magnetic component and the active component to alter the sedimentation velocity of the composite material in accordance with Stoke's Law to suspend the composite material within the fluid for a pre-determined period of time.

21. A system to remove a substance from a fluid, the system comprising:

a fluid containing a substance; and a composite material according to claim 1 that is capable of being added to the fluid for binding with the substance.

22. The system of claim 21, further comprising a magnet for selectively inducing a magnetic field to attract the composite material.

23. A system to remove a substance from a fluid, the system comprising:

a fluid containing a substance; and a composite material according to claim 13 that is capable of being added to the fluid for binding with the substance.

24. The system of claim 23, further comprising a magnet for selectively inducing a magnetic field to attract the composite material.

25. A composite material that may be suspended in a fluid for removing a substance contained in the fluid, the composite material comprising:

a composition of a buoyant component having a magnetic material incorporated therein at an amount sufficient to cause the magnetic material to be susceptible to an induced magnetic field; and an active material that is active with respect to the substance to be removed, wherein the active material comprises at least one metal oxide having a resultant net charge;

wherein the composite material has a bulk density of about 0.9 $g/cm^3$ to about 1.2 $g/cm^3$ which is greater than the specific gravity of the fluid and no greater than 115% of the specific gravity of said fluid, and the active material has a net charge that may be adjusted.

26. The composite material of claim 25, wherein the metal oxide comprises the formula $MO_x$, wherein x is between 1.980 and 2.015.

27. The composite material of claim 25, wherein the metal oxide comprises the formula $MO_x$, wherein x is between 1.80 and 2.0.

28. The composite material of claim 25, wherein the metal oxide comprises an oxide of titanium, zinc, iron, tin, bismuth, manganese, copper, silicon, zirconium, magnesium, aluminum, or a combination thereof.

29. The composite material of claim 25, wherein the active component further comprises streptavidin, biotin, guanidine, or a combination thereof.

30. The composite material of claim 25, wherein the magnetic component comprises a ferromagnetic material and a paramagnetic material.

31. The composite material of claim 30, wherein the ratio of the ferromagnetic material and the paramagnetic material of the magnetic component is sufficient to discourage self-attachment of two or more of said composite materials in said fluid.

32. The composite material of claim 25, wherein the active component comprises a porous material having a mean pore size which is at least an order of magnitude less than the mean pore size of the porous magnetic material, and wherein the porous active material is located within the open channels of the porous magnetic material.

33. A method for extracting a substance from a fluid, the method comprising:

providing a separation medium comprising a composite material of claim 25 having an active component;

contacting said separation medium with a fluid containing said substance, wherein at least a portion of the substance is bound to the active component having an affinity therefor;

removing the separation medium containing the bound substance from the fluid; and separating the bound substance from the separation medium.

34. A method of controlling the time of suspension of an active component in a fluid, the method, in sequential or non-sequential order, comprising:

providing a composite material according to claim 25;

contacting the composite material with a fluid containing a substance to be removed by the active component; and adjusting the amount of the magnetic component and the active component to alter the sedimentation velocity of the composite material in accordance with Stoke's Law to suspend the composite material within the fluid for a pre-determined period of time.

35. A composite material configured to be used in combination with a fluid to remove at least one substance in the fluid, the composite material comprising:

at least one buoyant component that is buoyant with respect to the fluid;

a magnetic component that includes an amount of paramagnetic material that is sufficient to cause the magnetic component to be susceptible to an induced magnetic field; and an active component comprising a metal oxide having a stoichiometric ratio resulting in the composite material having a net charge, wherein the active component is active with respect to the at least one substance to be removed;

wherein at least one of the magnetic component and the active component is at least partially attached to the buoyant component, and the composite material comprises a sufficient amount of the magnetic component and the active component to adjust the bulic density of the composite material to be about 0.9 $g/cm^3$ to about 1.2 $g/cm^3$, the density of the composite material being more than the density of the fluid and no greater than about 115% of the density of the fluid.

36. A system comprising:

a liquid; and a composite material suspended in the liquid, the composite material being used to remove at least one substance in the liquid, the composite material comprising at least one buoyant component that is buoyant with respect to the liquid;

a magnetic component that includes an amount of paramagnetic material that is sufficient to cause the magnetic component to be susceptible to an induced magnetic field; and an active component that is active with respect to the at least one substance to be removed;

wherein at least one of the magnetic component and the active component is at least partially attached to the buoyant component, and the composite material comprises a sufficient amount of the magnetic component and the active component to adjust the bulk density of the composite material to be more than the density of the liquid and no more than about 115% of the density of the liquid.

37. A composite material suitable for extracting a biological material from a fluid, the composite material comprising:

at least one buoyant component that is buoyant with respect to said fluid;

a magnetic component comprising a ferromagnetic material and a paramagnetic material; and at least one active component comprising at least one metal oxide having a resultant net charge, wherein the active component is capable of binding with a nucleic acid, protein, or bio/organic material;

wherein at least one buoyant component, the magnetic component, and the at least one active component are interconnected to provide the composite material, and the composite material comprises a sufficient amount of the magnetic component and the at least one active component to adjust the bulk density of the composite material to more than the specific gravity of the fluid and no greater than about 115% of the specific gravity of said fluid.

* * * * *

UNITED STATES PATENT AND TRADEMARK OFFICE

CERTIFICATE OF CORRECTION

PATENT NO. : 6,849,186 B2
DATED : January 1, 2005
INVENTOR(S) : Johnson et al.

It is certified that error appears in the above-identified patent and that said Letters Patent is hereby corrected as shown below:

Title page,
Item [*] Notice, delete "(169) Days" insert -- 251 Days --.

Signed and Sealed this

Twenty-third Day of August, 2005

JON W. DUDAS
*Director of the United States Patent and Trademark Office*